Oct. 25, 1960     D. H. CARTER ET AL     2,958,010
RECORDING SYSTEM
Filed April 17, 1959
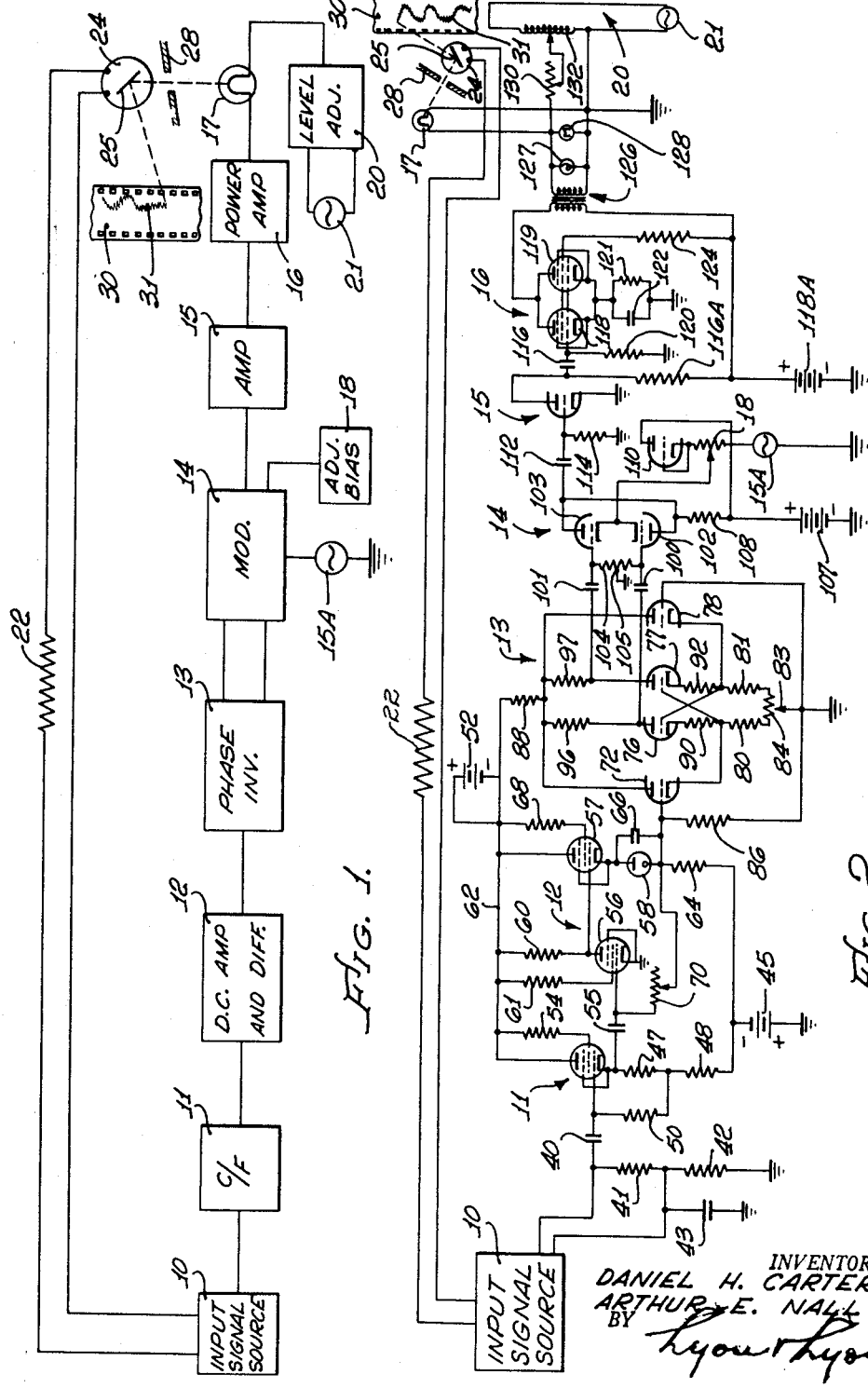
INVENTORS.
DANIEL H. CARTER
ARTHUR E. NALL JR.
BY
ATTORNEYS.

United States Patent Office 2,958,010
Patented Oct. 25, 1960

2,958,010

RECORDING SYSTEM

Daniel H. Carter, Houston, and Arthur E. Nall, Jr., Richardson, Tex., assignors to Welex, Inc., Fort Worth, Tex., a corporation of Delaware Filed Apr. 17, 1959, Ser. No. 807,194

9 Claims. (Cl. 315—307)

The present invention relates to improved means and techniques for recording a changing condition and more particularly to systems of the character wherein an amplifying system is used in conjunction with a recorder of the type in which a film or tape is used to make a record of movement of a light beam reflected from the mirror of a galvanometer or similar instrument, and such mirror is deflected in accordance with such changing condition.

A system of this character involves generally the use of a light source to project a beam of light upon a mirror attached to the movable element of a galvanometer. The light is reflected from the mirror onto a photosensitive film or tape, so that a continuous record is obtained of electrical values impressed upon the galvanometer. For example, in the electrical logging of bore holes or oil wells, a photosensitive film is geared to a logging tool which is lowered into the well. In response to variations of electrical properties of the earth in the vicinity of electrode unit, the electrical values are indicated by one or more galvanometers and these are recorded on film by the use of optical systems.

In connection with such recording systems difficulties are encountered in making a clear and legible record when the electrical variation, representative of the condition being recorded, undergoes rapid changes. In such case, the mirror forming a part of the galvanometer moves very rapidly when a sharp increase or decrease in the electrical values in its circuit occur, while at other times it moves very slowly when changes in the electrical values are small.

The clarity and legibility of a line or trace caused by a light beam on a film, being dependent on the amount of exposure, it is obvious that good results cannot be obtained if the film is moved at varying speeds or if the mirror in the galvanometer moves at varying speeds, unless some means is provided to compensate for the resultant variation in exposure of the film.

To obviate these difficulties, it is in an object of the present invention to devise improved electrical means for controlling the intensity of the light emitted by an incandescent electrical lamp in proportion to the speed of relative movement between a film and a beam of light originating in the lamp and projected upon the film.

It is a further object of the present invention to provide an improved control system for causing a lamp to emit light in proportion to the rate of change of the signal applied to the galvanometer used in conjunction with the lamp for photographic recording. The static value of current in a galvanometer circuit controls the extent of deflection of the movable element, i.e. mirror, thereof, but the rate of change in current, i.e. the first differential of current with respect to time, is the factor which controls the speed of the motion of the mirror. Therefore, if the intensity of light emitted by a lamp is made proportional to the rate of change in current in the galvanometer circuit, the amount of light given off will be approximately proportional to the speed of movement of the mirror on the movable element of the galvanometer, and if the light beam projected on a film from the mirror has its origin in a lamp so controlled, a uniform exposure of the film is obtained. The faster the mirror moves, the more intense is the light directed onto the film.

It is therefore another object of the present invention to provide an improved system of this character in which the intensity of the light emitted by the lamp is so varied as to cause it to be approximately proportional to the rate of change in current applied to the movable element of the galvanometer, so that the amount of exposure of one unit area of the film will be approximately the same as the others, thus compensating for the variations in relative velocity of movement between a spot of light from the lamp and the film.

Another object of the present invention is to provide an improved system of this character in which the rate of change of current applied to the galvanometer is more accurately determined electrically, and the resulting electrical quantity is then applied to the lamp through an improved circuit.

Another object of the present invention is to provide an improved system of this character in which only one active differentiating circuit is required to produce a voltage representative of the change in the galvanometer current.

Another object of the present invention is to provide an improved system of this character in which a single active differentiating circuit, as contrasted to a passive differentiating circuit, is used to thereby achieve the advantages of being far more accurate in determining the derivative of the current and also providing a larger amplitude output signal, thus eliminating some of the amplification necessary with a passive differentiating circuit.

Another object of the present invention is to provide an improved system of this character in which the signal differentiated by a single active differentiating circuit is applied to a single-ended network which includes a combined D.C. amplifier and phase inverter, so as to achieve high gain, good stability and the obtainance of a double-ended output signal for achieving other advantages of the present invention.

Another object of the present invention is to provide an improved system of this character in which the differentiated and phase-inverted signal is applied to a novel modulator circuit which now requires only a convenient 60-cycle source instead of a separate oscillator circuit.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1, largely in block diagram form, illustrates a system embodying features of the present invention.

Figure 2 is a schematic diagram which illustrates in more detail the system illustrated in Figure 1.

Referring to Figure 1, the input signal source 10 is considered representative of any source of current or voltage which is desired to be recorded on the photographic film. This current of voltage may, for example, be a current or voltage obtained in logging of a well bore and may, for example, be representative of the resistivity of the formations of the well bore established when and as a logging tool of conventional nature is being moved in a well bore.

This signal is first applied to a cathode follower stage 11 having its output circuit coupled to the combined D.C. amplifier and differentiating network 12. The output of this network 12 is applied as a single-ended signal to the phase inverter 13 which supplies a double-ended output signal to the modulator stage 14. A 60-cycle signal from source 15A applied to the modulator stage 14 is modulated in modulator stage 14 by the signal from the phase inverter stage 13; and the modulated output signal from modulator stage 14 is then applied to the incandescent lamp bulb 17 after first being amplified in the preamplifier stage 15 and then in the power amplifier stage 16.

The degree of modulation in stage 14 may be adjusted by an adjustable bias circuit 18 described more fully in connection with Figure 2. Also, the average intensity level of the lamp 17 may be present using level adjustment means 20 which is in the form of an auto transformer for adjusting the value of the voltage from source 21 applied to the lamp 17.

A voltage or current from source 10 is applied through resistance 22 to the galvanometer 24 of conventional construction which has a mirror 25 carried on a movable element of the galvanometer, such element being deflected in an amount depending upon the intensity of the voltage or current from source 10.

Light from the lamp 17 is transmitted to the galvanometer mirror 25 through an apertured system 28, and such light after reflection from the mirror impinges on the photographic tape or film 30 for establishing the trace 31 on such film. It is understood that the film 30, using conventional means, is driven at the same speed as the well logging tool in which the input signal is obtained.

Referring to Figure 2, one terminal of the input source 10 is coupled to the control grid of the cathode follower stage 11 through condenser 40, and such input terminal is also returned to ground through the series connected resistances 41 and 42. The junction point of these resistances 41, 42 is bypassed to ground by condenser 43 and is also connected to the other terminal of source 10.

The cathode follower stage 11 is of the pentode type and has its control grid connected to the negative ungrounded terminal of the bias source 45 through resistances 47 and 48, the junction point of which is connected to the grid of stage or tube 11, through resistance 50. The anode of tube 11 is connected to the positive ungrounded terminal of the source 52; and the screen grid of tube 11 is also connected to such source 52 through resistance 54. The output appearing on the cathode of the cathode follower stage 11 is applied through condenser 55 to the control grid of tube 56 which together with tube 57 and the voltage regulator tube 58 comprise the D.C. amplifier and differentiating network 12 indicated as such in Figure 1.

A combined D.C. amplifier differentiating network of this character is described in "Wave Forms" on page 660 of volume 19 of the Radiation Laboratory Series. The tube 56 is of the pentode type and has its cathode grounded. The anode and screen grid of tube 56 are connected respectively through resistances 60 and 61 to the high voltage lead 62 which is connected to the positive terminal of source 52. The anode of tube 56 is also connected directly to the control grid of the pentode tube 57 which has its cathode connected to one terminal of the voltage regulating tube 58, the other terminal of such tube 58 being connected through resistance 64 to the negative terminal of the bias source 45.

This regulating tube 58 is shunted by condenser 66.

The anode of tube 57 is connected directly to the high voltage lead 62; and the screen grid of the same tube 57 is connected to the same high voltage lead through resistance 68.

A feedback connection comprising adjustable resistance 70 extends from the control grid of tube 56 to the junction point of tube 58 and resistance 64, such junction point being connected directly to the control grid of tube 72 in the next succeeding phase-inverter stage 13. The differentiated output voltage thus appears on the control grid of tube 72.

This differentiating network comprising tubes 56, 57 and 58 operates with relatively rapid changes of the input voltage, and its response time is of the order of the magnitude of several microseconds.

It is also noted that the cathode follower stage 11 is used for impedance matching purposes. This differentiating network 12 includes one stage of amplification in tube 56, followed by a cathode follower 57 with a voltage-regulating tube 58 in the cathode circuit to correct the D.C. level. The adjustable feedback resistance 70 permits variations of the overall gain as the input-versus-rise rate varies from one wave form to another.

It is noted also that the phase inverter network 13 having the single-ended differentiated signal applied thereto, i.e. to the grid of tube 72, develops a double-ended signal appearing across the anode of tubes 76 and 77. The circuitry of this phase inverter stage 13 is now described.

The cathodes of tubes 72 and 78 are returned to ground through corresponding resistances 80 and 81 and the adjustable tap 83 on the potentiometer-type resistance 84 which has its outside terminals connected to corresponding terminals of resistances 80 and 81. This tap 83 is adjusted to balance the phase inverter.

The control grid of the D.C. amplifier stage 72 is returned to ground through resistance 86 and the control grid of the other D.C. amplifier tube 78 is directly connected to ground. The anodes of the tubes 72 and 78 are each connected to the high voltage lead 62 through the common resistance 88.

The cathode of tube 76 is returned to ground through resistance 90, resistance 80, and the tap 83 on resistance 84; similarly, the cathode of tube 77 is returned to ground through the resistance 92, resistance 81 and the tap 83 on the balancing resistance 84. The junction point of resistances 90 and 80, to which the cathode of the D.C. amplifier tube 72 is connected, is connected also to the control grid of tube 77; and similarly, the junction point of resistances 92 and 81, to which the cathode of the other D.C. amplifier tube 78 is connected, is also connected to the control grid of tube 76. The anode of tubes 76 and 77 are connected to the high voltage lead 62 through corresponding load resistances 96 and 97 and the common resistance 88.

This combined amplifying and phase inverting circuit 13 thus develops a double-ended signal which is applied from the anodes of tubes 76 and 72 through corresponding condensers 100 and 101 to the control grids of the modulator tubes 102 and 103 in stage 14. These grids are returned to ground respectively through resistances 104 and 105.

The anodes of tubes 102 and 103 are interconnected and receive space current from the positive ungrounded terminal of source 107 through resistance 108.

For purposes of introducing a modulating 60-cycle voltage, the interconnected cathodes of tubes 102 and 103 are connected to an adjustable tap on the potentiometer-type resistance 18 which supplies also an adjustable bias voltage for the tubes 102 and 103. For this purpose, the resistance 18 is connected in a series circuit which includes, in turn, the A.C. voltage source 15A, the resistance 18, the tube 110, connected as a diode, and the D.C. source 107. The A.C. source 15A, in practice, may comprise simply a 5-volt secondary transformer winding of a conventional A.C. power supply used in developing the various D.C. voltages represented in Figure 2 simply as batteries.

It will be seen that the current flowing through the potentiometer-type resistance 18 includes both a unidirectional component as well as an alternating current component, and that the unidirectional component serves as a bias for the modulator tubes 102 and 103, and that the alternating current component flowing through resistance 18 provides a source of voltage which is modulated in accordance with the differentiated and phase-inverted signal applied to the control grid of the modulator tubes 102 and 103.

The modulated A.C. voltage thus developed on the interconnected anodes of tubes 102 and 103 is applied through condenser 112 to the control grid of the voltage preamplifier stage 15, such grid being returned to ground through resistance 114. The cathode of tube 15 is grounded; and the anode of tube 15 is connected through load resistance 116A to the positive ungrounded terminal of source 118A.

The modulated and amplified signal appearing on the anode of tube 15 is then applied through coupling condenser 116 to the power amplifier stage 16 which includes the two parallel connected tubes 118 and 119. The grids of these tubes 118 and 119 are returned to ground through resistance 120; and the cathodes of the same are returned to ground through the common bias resistance 121 which is shunted by the condenser 122. The screen grids of tubes 118 and 119 are each connected to the positive terminal of source 118A through resistance 124. The anodes of tubes 118 and 119 are connected to the positive terminal of the same source 118A through the primary winding of the output transformer 126. The secondary winding of this transformer 126 has connected in parallel therewith each of the following: the indicating lamp 127, the meter 128, and the incandescent lamp 17 which cooperates with the apertured system 28, the mirror 25 and the film 30 to photograph the trace 31.

In order to adjust the normal illumination intensity of the lamp 17, there is provided an adjustable resistance 130, and autotransformer 132, and the A.C. source 21. The autotransformer 132 has its outside terminals connected to corresponding terminals of the source 21, and the adjustable tap on the autotransformer 132 is connected through the adjustable resistance 130 to one terminal of the lamp 17, the other terminal of the lamp and one terminal of source 21 being grounded.

It will be seen from the foregoing that the signal voltage applied from source 10 and applied to the active differentiating network 12 through the cathode follower stage 11 which serves to provide the desired impedance match, is differentiated by such stage 12. This means that the voltage appearing at the output of the differentiator stage 12 and applied to the phase-inverter stage 13 represents a change in voltage of the input source of voltage, i.e. the differentiator stage 12 effectively operates mathematically to produce the first derivative of the intensity of voltage with respect to time. The output of the differentiator stage 12 is thus greater, the greater the change in the magnitude of the source voltage 10. This is also true with respect to the voltages applied to the control grids of the modulator stage 14. This voltage which appears on the grids of the modulator tubes 102 and 103 serves as a modulating source for modulating the 60-cycle voltage of adjusted intensity supplied to the cathodes of tubes 102 and 103 from the adjustable tap on resistance 18. The 60-cycle signal appearing on the interconnected anode of the modulator tubes 102 and 103 will thus be greater, the greater the change in voltage of source 10; and thus the modulated signal after amplification in stages 15 and 16 produce a greater voltage across the galvanometer lamp 17 for increased intensity of illumination.

Thus, the desired result is obtained, namely the intensity of the light from the galvanometer lamp 17 increases with the rate at which the voltage of source 10 changes and in substantially direct proportion therewith.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described wherein it is desired to produce, on a photographic film, a substantially uniformly thick trace representing a varying electrical quantity by varying the intensity of illumination impinging on said film in accordance with the rate at which said quantity varies, the combination comprising, a lamp producing said illumination, means normally energizing said lamp at a predetermined level, a source of said varying electrical quantity, an active differentiating network having amplification means incorporated therein coupled to said source and functioning to produce an amplified signal representative of the rate of change of said quantity, phase inverting means coupled to said network and producing a double-ended signal from said amplified signal, a modulator circuit having a double-ended input circuit to which said double-ended signal is applied and functioning to produce a single-ended output signal which varies in accordance with the rate of change of said quantity, and means coupling said single-ended output signal to said lamp to change said level in accordance therewith.

2. A system as set forth in claim 1 in which said modulator circuit includes a pair of amplifying devices having corresponding control elements to which said double-ended signal is applied, said amplifying devices having corresponding output elements which are interconnected and to which a composite unidirectional and alternating current voltage is applied, said unidirectional voltage serving to bias said devices at a predetermined value and said alternating current voltage being modulated by said double-ended signal.

3. A system as set forth in claim 2 including a single adjustable element for adjusting jointly the magnitude of both said unidirectional voltage and said alternating current voltage.

4. A system wherein the exposure of a moving photographic film resulting from a first function of movement of a light beam relative to said film and a second function of the intensity of said light beam, is maintained constant, comprising a single active differentiating network including amplifying means connected to a source of a first varying quantity indicative of said first function for producing an amplified indication representing the rate of change of said first function, phase inverting means coupled to said differentiating network for producing a double ended indication from said amplified indication, modulating means having a double ended input in connection with said phase inverting means for producing a single ended output indication which varies in accordance with the rate of change of said first quantity, and means connected to said modulating means for producing a second varying quantity representing said second function in direct response to the rate of change of said first function.

5. A system as set forth in claim 4 in which said modulating means includes a pair of amplifying devices having corresponding control elements to which said double ended indication is applied, said amplifying devices having corresponding output elements which are interconnected and to which a composite unidirectional and alternating current voltage is applied, a single adjustable element coupled to said amplifying devices for adjusting jointly the magnitude of both said unidirectional and said alternating current voltage, said unidirectional voltage serving to bias said devices at a predetermined level and said alternating current voltage being modulated by said double-ended indication.

6. A system as set forth in claim 5 in which said alternating current voltage is 60 c.p.s.

7. A system wherein a physical quantity resulting from a first function acting in cooperation with a second function is maintained constant, comprising an active differentiating network including amplifying means connected to a source of a first varying quantity indicative of said first function for producing an amplified indication representing the rate of change of said first function, phase inverting means coupled to said differentiating network for producing a double ended indication from said amplified indication, modulating means having a double ended input in connection with said phase inverting means for producing a single ended output indication which varies in accordance with the rate of change of said first quantity and means connected to said modulating means for producing a second varying quantity representing said second function in direct response to the rate of change of said first function.

8. A system as set forth in claim 7 in which said modulating means includes a pair of amplifying devices having corresponding control elements to which said double ended indication is applied, said amplifying devices having corresponding output elements which are interconnected and to which a composite unidirectional and alternating current voltage is applied, a single adjustable element coupled to said amplifying devices for adjusting jointly the magnitude of both said unidirectional and said alternating current voltage, said unidirectional voltage serving to bias said devices at a predetermined level and said alternating current voltage being modulated by said double ended indication.

9. A system as set forth in claim 8 in which said alternating current voltage is 60 c.p.s.

References Cited in the file of this patent
UNITED STATES PATENTS
2,415,880   Hassler _____ Feb. 18, 1947